United States Patent Office 2,851,361
Patented Sept. 9, 1958

2,851,361

CARBONATED DRINK AND CONCENTRATE FOR PRODUCING SAME

Isaac M. Diller, Brooklyn, N. Y., assignor to Henry Brout, Larchmont, N. Y.

No Drawing. Application June 22, 1955
Serial No. 517,373

24 Claims. (Cl. 99—78)

This invention relates to a carbonated soft drink and to a concentrate, i. e., an effervescive powder or tablet, for producing the same.

The patent literature is replete with concentrates which have been proposed to supply the demand for palatable soft drinks that are produced by the simple addition of concentrates to cold tap water. The reward for a desirable concentrate is enormously lucrative; yet, to date no successful commercial concentrate has been made.

It is an object of the present invention to provide a concentrate of the character described which is commercially feasible to produce.

It is another object of the invention to provide a concentrate of the character described which when added to water produces a pronounced initial discharge of carbon dioxide and then a continued satisfactory ebullition over at least the period of time customary with pressure-carbonated beverages, for example, a half an hour.

It is another object of the invention to provide a concentrate of the character described which employs ordinary inexpensive chemicals but which nevertheless produces a satisfactory and palatable carbonated soft drink.

It is another object of the invention to provide a concentrate of the character described which will produce a substantial degree of carbonation, such for example as that obtained with pressure-carbonated beverages.

It is another object of the invention to provide a concentrate of the character described wherein the drink produced has a sodary effect and retains such effect over a lengthy period of time, on the order for example of that of a conventional pressure-carbonated beverage.

It is another object of the invention to provide a concentrate of the character described which creates a carbonation yielding fine rather than coarse bubbles, and wherein plentiful further ebullition occurs when the drink is imbibed.

It is another object of the invention to provide a concentrate of the character described which employs chemicals that do not impart an unpleasant flavor or undesirable taste or salinity to the drink produced and which therefore does not require the use of excessive sweetener or flavoring to conceal the flavor and/or taste of the chemicals, it being virtually impossible to conceal salinity.

It is another object of the invention to provide a concentrate of the character described which will not impart a saline or metallic taste to the drink made therefrom even though it provides a carbonation fully equal to that present in pressure-packed beverages.

It is another object of the invention to provide a concentrate of the character described which is composed of ingredients that blend well with the flavors conventionally employed in carbonated soft drinks.

It is another object of the invention to provide a concentrate of the character described which yields a clear and sparkling carbonated soft drink that retains such appearance over an adequate period of time.

It is another object of the invention to provide a carbonated soft drink of unusually pleasant taste and which is "dry," i. e. of a low order of sweetness, so that it does not have a cloying taste or leave a cloying after-taste as is the case with many present-day sweet pressure-carbonated soft drinks.

It is another object of the invention to provide a carbonated soft drink including in solution a metallic radical that eliminates the usual lingering sweetness of conventional pressure-carbonated soft drinks.

It is another object of the invention to provide a concentrate of the character described which is simple and inexpensive to manufacture and can be stored over long periods of time without deterioration.

It is another object of the invention to provide a concentrate of the character described which has the taste and refreshing attributes of a pressure-carbonated beverage but which is substantially healthier than the latter because it does not have an acidity low enough to be injurious to the teeth and because it has residual ingredients that are healthful as well as fully palatable.

Other objects of the invention in part will be obvious and in part will be pointed out hereinafter.

The invention accordingly consists in the concentrates, carbonated drinks and series of steps hereinafter described and of which the scope of application will be indicated in the appended claims.

This application is a continuation-in-part of my co-pending application Serial No. 442,919 for Carbonated Soft Drink and Concentrate for Producing Same, filed July 12, 1954.

In preparing concentrates of the character described, among the main problems presented are obtaining a satisfactory initial burst of ebullition, continuing ebullition over a sufficiently long period, and rapid dissolving and/or very finely suspending the concentrate so that the drink will clear promptly. In addition, there should be a soda quality to the drink, so that a tingling and refreshing effect is created by extra ebullition when the drink is imbibed. Also, the drink must remain clear for a reasonable period and the chemicals employed to produce effervescence must not spoil the flavor and/or taste of the drink or cause undesirable physiological results.

According to the invention, the foregoing problems have been solved and a concentrate produced which is adapted to accomplish all the aforementioned objects. In the description of the invention given below, the critical features thereof which render the instant invention successful where the art has for so long failed are set forth.

In carrying out the invention a carbonate factor and an acid factor are employed to provide the basic effervescent couple. In addition, flavoring agents, coloring agents, binders, etc., are used to make up the commercial concentrate.

Pursuant to the invention a carbonate factor including in whole or in part calcium carbonate is employed in conjunction with an acid factor predominantly comprising citric acid. These compounds are utilized because of their capacity when used under the conditions prescribed below to produce a concentrate which will satisfy the requirements as to clearing and ebullition.

Since calcium carbonate is comparatively insoluble in water, particularly in water at the low temperature customary for a soft drink, preferably a highly water-soluble carbonate is added to the carbonate factor to produce an initial burst of ebullition. Preferably, an alkali carbonate such as potassium bicarbonate is employed. The presence of an alkali radical can also increase the solubility and dispersibility of the calcium carbonate. At least 60% of the carbonate factor must be calcium carbonate in order to produce the requisite protracted ebullition of fine bubbles and the soda effect of the resulting drink as well as to avoid a level at which potassium salinity becomes objectionable. Potassium salinity is the least taste-producing of that of the alkali metals, and when potassium is used in conjunction with the calcium carbonate and restricted to the ratio shown its taste is unobjectionable.

The carbonate factor may contain small amounts of alkaline earth carbonates other than calcium carbonate. Moreover, small amounts of alkali carbonates other than potassium bicarbonate are tolerable.

Carbonate is present in amounts on the order of those present in pressure-carbonated beverages, i. e., approximately from 1.4 to 2.3 grams of carbon dioxide per seven fluid ounces of beverage.

To provide this result, the citric acid, potassium bicarbonate, calcium carbonate mix is used in an amount of from 7 to 12 grams for 7 fluid ounces of beverage. Below the 7 gram limit, the drink will be flat and above 12 grams too much carbon dioxide will be present and the taste of the chemicals will become apparent to the drinker of the beverage. Preferably, I employ between approximately 10 and 11 grams of the concentrate.

According to the invention, the effervescent concentrate should disintegrate in approximately one and one-quarter minutes. More rapid disintegration would cause too violent bubbling with resultant loss of carbon dioxide and unpleasant splashing of the drink. If the concentrate takes substantially longer to become distributed, there also is an unnecessary loss of carbon dioxide because the gas is evolved for an extended period of time before the drink can be imbibed. Of course, the consumer's patience would be taxed by waiting too long for the drink to be ready for use if disintegration takes too long.

As mentioned above, the drink must be clear in a short time. According to the invention, a clear drink preferably will be produced in two to two and one-half minutes including disintegration time and by this time the sodary effect will be present if not sooner. A longer period of clearing would not be desirable in a commercially salable product.

Calcium carbonate is a comparatively insoluble compound and in accordance with the present invention is used in amounts far exceeding the limits of its solubility when added to water or even added to water containing carbonic acid. Indeed, it is used in such massive amounts that as mentioned above a degree of carbonation equivalent to that of a pressure-carbonated drink is secured. Thus, the production of a clear drink in spite of the use of calcium carbonate is at the heart of the invention, calcium carbonate being essential because of its ability to cause prolonged ebullition and because of the blandness in taste of it and its reaction products. Also, it does not have an adverse effect on the health, but rather it is to be highly desired.

I have discovered that under certain conditions massive amounts of calcium carbonate can be placed in collodial suspension and supersaturated solution so that the foregoing desirable results can be obtained. Thus, when the clear, ready-to-be-imbibed, appetizing beverage is produced, unreacted calcium carbonate is on hand to provide a slow continuous bubble-producing reaction in the cold and quiescent glass and bursts of ebullition when the drink is taken into the mouth of the drinker.

Pursuant to the invention, upon disintegration of the mass of concentrate, the calcium carbonate initially goes into solution and mostly into a very fine colloidal suspension. The drink becomes clear when the suspended particles of calcium carbonate have become so small as to be invisible. All of the calcium carbonate will not be in true solution or reacted for some time even after clearing of the drink. The other elements of the concentrate are readily soluble or finely dispersable in water and present no problem of clearing.

Of great importance in producing the requisite collodial suspension of calcium carbonate are the particle size, shape and apparent density thereof. The calcium carbonates should be of a small particle size, such as 0.03 micron, with the normal size distribution on either side of this average, the measure referring to equivalent diameter. The maximum median size of the calcium carbonate particles should not exceed 0.1 micron. It is preferred that the crystal shape be such that the bulking value is high. By high bulking value is means 30 pounds per cubic foot for cubiform particles and 24 pounds per cubic foot for acicular particles.

The particle sizes given are in the terminology of the calcium carbonate industry; they are so calculated as to be applicable to both calcite and arragonite crystal shapes. The arragonite crystal because of its greater surface for a given equivalent diameter and its lower bonding energy is preferred, but the calcite crystal is suitable if its particle size is small enough.

An important factor in dispersing the calcium carbonate is the colloid supporting effect of the flavors, which themselves disperse essentially in a colloidal manner.

The density of the tablet is another critical factor. It should be about 1.3. Inasmuch as the average absolute density of the materials employed is only about 2.0 and the particle sizes of the materials are small, it is difficult to secure the required density. I have found that the requisite density can be secured by removing entrapped and occluded air, as by evacuation or heating the material to about 140° F. Density may also be increased by vibration of the mixture prior to compression during the tableting operation. Further, the use of binders and pressure aids in obtaining the proper density. Lubrication of the die walls contributes to this in a surprising manner.

The reason for density being critical is that it is highly undesirable for the tablet to rise to the surface of the liquid. If the tablet is light enough to be buoyed up to the top of the drink by the escaping gases and surface tension effects on the calcium carbonate, undissolved calcium carbonate is floated off and may produce an unsightly scum at the top of the drink. Should undissolved calcium carbonate sink, it forms sediment. Furthermore, regardless of the flotation problem, the density must be sufficient so that the main disintegration will take place in the lower portion of the glass. Also, the calcium carbonate is held in intimacy with the other ingredients long enough for the colloidal suspension thereof as well as for some dissolving.

The ratio of the minimum amount of citric acid, i. e. the acid factor, to total carbonate factor is quite important and varies directly with the percentage of calcium carbonate present in said carbonate factor. Thus, if the carbonate factor comprises approximately 60% by weight of calcium carbonate, a minimum of 11.4 and a maximum of 20 parts by weight of acid are employed for 10 parts by weight of total carbonate factor, the remainder of the latter essentially comprising potassium bicarbonate. Where 70% by weight of said factor is calcium carbonate, 11.5 to 20 parts by weight of citric acid is employed for 10 parts by weight of total carbonate factor. For a carbonate factor containing 90% calcium carbonate the ratio is 12.4 to 20 parts by weight citric acid for 10 parts by weight of total carbonate factor. If the carbonate factor is entirely made up of calcium carbonate, 13.5 to 20 parts by weight of citric acid is employed for 10 parts by weight of the carbonate factor. The ratios also vary with the different pH's of solution desired (as will be described hereinafter) and with the flavors employed. The lower limits are critical; i. e., at least that amount of citric acid is required to produce a successful concentrate with the particular carbonate factor employed. The upper limit is chosen as a matter of taste. A higher quantity of citric acid is not desirable since it would make the resulting drink too sharp-tasting for most consumers, but such higher quantity would be otherwise acceptable. Fifteen parts by weight of citric acid to ten parts by weight of carbonate factor is the upper limit for most people, and in this group 13.8 to 10 parts by weight is the preferred ratio.

The acid and carbonate factors of the concentrate must be so proportioned that the solution produced from addition of the effervescent tablet to tap water will have a pH not greater than 5.0 and preferably not less than 3.9 at 10° C. Desirably, a pH between 4.1 and 4.8 at 10° C. is employed. The upper limit is critical; the lower limit of pH employed will depend on the taste of the user and the flavor of the beverage, i. e., some flavors require lower pH's than others. If the pH is below 3.9, however, the equivalent free acid is excessive to most people. All pH's given in this specification represent measurements taken by glass electrode at about 10° C. at about the time of clearing of the drink.

The basic ingredients should be thoroughly mixed for the essential rapid solution and fine colloidal suspension of the calcium carbonate, i. e., each ingredient should be distributed throughout the others. Unless the calcium carbonate is uniformly dispersed throughout the concentrate, the agitation of the solution caused by ebullition when the concentrate is added to water may separate the calcium carbonate and float it off as unsightly particles which will either rise to the surface, producing a revolting scum, or sink to the bottom, producing an unpleasant sediment, neither of which can be cured by stirring. It is reiterated that the calcium carbonate must be of the small particle size noted above to achieve colloidal suspension thereof under the prevailing conditions herein set forth.

In carrying out the invention, the calcium carbonate and citric acid are first mixed, i. e. blended, as by physical blending. Next, the potassium bicarbonate is mixed in by blending with the first mixture. Dyes, flavors, sweeteners and the like are then added to the mix by blending.

The above series of steps is the preferable method of producing the final effervescive concentrate. Satisfactory results can be obtained, however, if the calcium carbonate, citric acid and potassium bicarbonate are all mixed together at one time, or if the calcium carbonate and potassium bicarbonate are mixed first and then are mixed with citric acid or if the citric acid and potassium bicarbonate are first mixed and then blended with the calcium carbonate, but this last method may result in some reaction during mixing. The important factor is that the three basic ingredients ultimately be dispersed with respect to one another. Although homogeneity in the ordinary sense may be achieved in a few minutes, it is desirable to continue the blending for an extended time period, e. g., two hours. In this way, surrounding of citric acid particles with calcium carbonate particles is achieved. Because such surrounding is required, calcium carbonate particles cannot be coated, although, as mentioned below, the citric acid particles can be precoated.

The citric acid must be of a particle size such that it can be thoroughly mixed with the calcium carbonate, i. e., the particles thereof must not be too large in size. Preferably, powdered anhydrous citric acid is employed; if crystalline citric acid is employed, there is a tendency for reaction to occur prior to the use of the concentrate. Also, one of the products of reaction is water which will increase the premature reaction betweeen the base and acid. Such premature reaction is of course undesirable because it reduces the shelf life of the concentrate. Powdered anhydrous citric acid ordinarily has a size on the order of a mean diameter of .001 inch or less, and this is small enough for the requisite intimate blending. When citric acid and calcium carbonate are employed in the proper particle sizes, the smaller calcium carbonate particles will surround the citric acid particles. This is important in achieving the juxtaposition of particles in the mix necessary for producing a colloidal suspension.

Alternatively, the citric acid may be pretreated with a biose or monose as by mixing the acid and sugar in a solvent, e. g., water, evaporating the latter, dessicating the resulting crystals to eliminate the water, and powdering the dried product to permit the above-described blending. Dextrose, for example, may be employed in a ratio of ten parts citric acid by weight to one part dextrose by weight. The sugars have the property of crystallizing out on the outside of other crystals coming out of the same solution. If sucrose is used, processing must be rapid to hold down formation of levulose. Such pretreatment of the citric acid has been found to have a salutary effect in binding the tablet. The calcium carbonate must not be coated unless the coating is negligibly thin so that it does not affect the size of discrete particles sufficiently to remove them from the range set forth above. The coating must be readily penetrable.

Although the acid factor essentially comprises citric acid, it has also been found that highly desirable results can be obtained where there is replacement thereof to some extent by a hexosephosphoric acid. Such acids are products which occur in nature and are healthful. Moreover, they have a highly desirable effect in flavor over and above that of the essential oils of the concentrate.

The prompt, colloidal suspension and solution of calcium carbonate is aided by the presence of carbonic acid and citric acid; also, the alkali metal ion (preferably potassium ion) aids in finely dispersing and dissolving the calcium carbonate. Carbonic acid is formed initially in great quantity by the very rapid reaction of potassium bicarbonate and citric acid; it is also formed by the reaction of calcium carbonate and citric acid.

It is believed that, in addition to the colloidal suspension of calcium carbonate, a supersaturated solution of calcium carbonate and mono-calcium citrate is present at about the time the drink becomes clear. The reason that the solution is supersaturated with calcium carbonate is that the highly favorable factors for solution, i. e., large amounts of carbonic acid, citric acid and potassium ion, only last a short time. As the factors increasing the capacity of the solution for retaining calcium carbonate in solution diminish, the capacity itself falls. The calcium carbonate, however, does not come out of solution, so the solution is supersaturated with it. The conditions inducing solution of the calcium carbonate decrease because the carbon dioxide passes out of the solution and the concentration of citric acid decreases. Moreover, complexes are formed which are not so effective in increasing the solubility of calcium carbonate as the original chemicals. The mono-calcium citrate, formed by the reaction of calcium carbonate and citric acid, itself slowly reacts with the dissolved and colloidally suspended calcium carbonate.

After the initial burst of ebullition provided by the potassium bicarbonate and initially reacting calcium carbonate, there is a prolonged ebullition of fine bubbles because of the slow reaction of the colloidally suspended calcium carbonate with the citric acid and the mono-calcium citrate. This continues for at least one half-hour. Whenever the drink is imbibed, an excess of ebullition occurs in the drinker's mouth because the heat and mechanical activity thereof causes the reaction of citric acid and colloidally suspended calcium carbonate to be accelerated. In a cool glass, however, the reaction continues to be slow and steady.

The concentrate may include a soluble or finely divided (non-clouding) edible lubricant for tablet adhesion and to expedite freeing of the tablet from the dies in which it is produced. Pursuant to the invention, the specific lubricant is polyethylene glycol. For a tablet made essentially with artificial sweetener, a small quantity of dextrose serves as a binder. The lubricant is not essential as a part of the tablet mixture if the die walls and punches are lubricated. Colloidal lubricants aid the fine colloidal suspension of the calcium carbonate.

The flavoring agent should be substantially free of terpenes or any other flotation agent. Terpenes are flotation agents for calcite. It is believed that the flavoring agent ordinarily has a colloidalizing effect which aids in placing and keeping calcium carbonate in colloidal suspension long enough to react. Therefore, if flavoring is omitted, preferably it is replaced by another colloidalizing agent. The lubricants also are beneficial in this regard since these essential oils and lubricants aid in wetting the calcium carbonate.

If sugar sweetener is employed, it should be macrocrystalline; artificial sweetener may constitute a combination of calcium cyclamate and calcium saccharine.

Any edible water-soluble coloring agent can be employed. To color the tablet as well as the drink it produces, the coloring agent may be spread over the surface of some of the particles of the mix as by lixiviation. "Lixiviation" as used herein refers to the process of dissolving or dispersing the coloring agent and an ingredient of the mix in a liquid, and evaporating the latter. The solution is stirred during evaporation to obtain a uniform mixture until evaporation is complete. If the tablet is to be white, the coloring agent should have a large (ordinary) particle size and be included by simple mixing as a powder with the other powders.

Tablets or granules embodying the invention are formed in dies by compression. The die pressure is a factor in producing a commercially satisfactory tablet. If it is too low, the tablets or granules will be fragile, and if the pressure is too great, disintegration when the tablet is added to water may be slowed down beyond the desired time limit. Moreover, too great a pressure will also delay the initial reaction and may cause a premature reaction in the compression dies. The pressure to be employed will depend to some extent on the particular lubricants, sweeteners and binders used and the sizes and shapes of the tablets. Also, the exact basic materials employed and the sizes and shapes thereof, the tablet shape desired, and the measures taken to obtain the desired density influence the amount of pressure to be employed.

I have found that when a tablet employing sugar as a sweetener is made in a wall lubricated die, a pressure of 4,000 pounds per square inch is appropriate. A substantially similar pressure is proper with artificially sweetened tablets employing a binder, such, for example, as dextrose.

The shape of tablet in itself is not critical. It is desirable, however, to present a minimum surface so that there will be less tendency for the concentrate to float in the initial ebullition and prior to fine colloidal suspension and solution of the calcium. Therefore, tablets are preferred of a cubical or cylindrical shape in which the length is the square root of the cross-sectional area. The use of readily soluble binders and prolonged blending can be employed to obviate compression in whole or in part by the formation in the well known manner of particle agglomerates having adequate density as specified above.

In accordance with a refinement of my invention, I may include phosphoric acid to improve the taste of certain flavored drinks. The phosphoric acid desirably is present in the concentrate as a solid derivative partially replacing the citric acid. The phosphoric acid derivative may constitute, for example, a hexosephosphoric acid ester such as mentioned earlier herein. Alternatively, I can employ monocalcium phosphate $$(Ca(H_2PO_4)_2)$$

another particularly useful derivative.

The amount of monocalcium phosphate which can be used is limited by physical factors, such for example, as the pH of the beverage; the solubility of the phosphate derivative and requirements of taste. I use on the order of 0.1 gram monocalcium phosphate in a seven ounce drink.

I have found that the incorporation of a slight amount of monocalcium phosphate as proposed above also is advantageous with cherry-flavored drinks.

By way of example, I have set forth below various compositions embodying my invention as well as processes for making the same.

*Example I.—Grape carbonating concentrate*

| Constituents: | Grams |
|---|---|
| Precipitated calcium carbonate (0.03 micron average mean diameter) | 328 |
| Dried powdered potassium bicarbonate (approx. .004 inch average mean diameter) | 140 |
| Anhydrous powdered citric acid (approx. .004 inch average mean diameter) | 632 |
| Grape flavoring | 20 |
| Certified purple dye | 1.2 |

The citric acid and calcium carbonate are tumbled in an internally smooth drum six inches in diameter and a foot long, turning about a horizontal axis parallel to the longitudinal axis of the drum and displaced one inch therefrom. The speed of rotation is 90 R. P. M. The tumbling is carried out for about three minutes. Next the potassium bicarbonate is added to the drum and tumbling continued for about another three minutes. It may be mentioned at this point that the potassium bicarbonate is dried to minimize surface moisture.

Now the flavor is put in the drum. The flavor is one of a type which constitutes a flavoring ingredient aggregated with a large proportion of a carrier such as gum arabic and sorbitol. In a typical flavor, the carrier constitutes the major amount, ranging as high as 99% by weight. Tumbling is continued after addition of the flavor for another few, e. g. three, minutes.

Finally the dye is added and tumbling continued for a few more minutes. Now that the ingredients have been blended to form a homogenous mixture, the tumbling is thereafter continued for a protracted period, for example 1½ to 2 hours to attain the desired dispersion. During the tumbling a humidity of about 30% is maintained at around 75° F.

The composition is blended by tumbling in a fluted drum, e. g. in a McClelland batch mixer, with 2400 grams of sugar in the form of fine crystals of about 0.01 inch average mean diameter. Satisfactory blending is attained in about three minutes. The sweetened composition now is ready to be put up in any desired commercial form.

For example, the sweetened composition can be tableted in conventional dies at a pressure of 4000 p. s. i., the dies preferably first having had applied thereto a water-dispersable surface tension depressant such as stearic acid, polyethylene glycol 4000, oleic acid, stearates, oleates, or other fatty acids or fatty acid derivatives.

A 35 gram tablet makes a satisfactory seven ounce drink. It is to be noted here that when describing the weight of a drink herein I have referred to the drink with the concentrate added.

*Example II.—Root beer carbonating concentrate*

| Constituents: | Grams |
|---|---|
| Precipitated calcium carbonate (0.03 micron average mean diameter) | 337 |
| Dried powdered potassium bicarbonate (approx. .004 inch average mean diameter) | 149 |
| Anhydrous powdered citric acid (approx. .004 inch average mean diameter) | 604 |
| Root beer flavor | 0.2 |
| Certified caramel-colored dye | 1.3 |
| Sugar | 2400 |

The blending and dispersion procedure is the same as for Example I except that the flavoring oil instead of being "solidified" by means of a carrier is added to the calcium carbonate before the citric acid is added and is tumbled for an extensive period, e. g. an hour, until the oil has been spread over the calcium carbonate particles.

A 35 gram tablet makes a satisfactory seven ounce drink.

*Example III.—Kola carbonating concentrate*

Constituents:

| | Grams |
|---|---|
| Precipitated calcium carbonate (0.03 micron average mean diameter) | 383 |
| Dried powdered potassium bicarbonate (approx. .004 inch average mean diameter) | 43 |
| Anhydrous powdered citric acid (approx. .004 inch average mean diameter) | 575 |
| Kola flavoring (on gum arabic and sorbitol) | 20.5 |
| Certified caramel-colored dye | 1.3 |

The blending and dispersion procedure is the same as for Example I except that the dye is added to the calcium carbonate before the citric acid is added. The mixture of dye and calcium carbonate is treated with a non-toxic lixiviating, volatile liquid, e. g. absolute ethyl alcohol in a sufficient quantity for easy mixing. The ethyl alcohol is evaporated while the mixture is stirred. This causes the dye to be very finely distributed over, by coating, the calcium carbonate and as a result the entire composition is tinted to the shade of the dye. This is in contrast to the color of the composition in Example I in which the dye has no noticeable effect on the end color of the dry concentrate which is white. It should be noted that this modification of the process does not impose so thick a coating as to increase the maximum average mean diameter of the calcium carbonate beyond the critical range.

*Example IV.—Artificially sweetened concentrate*

Constituents.—The ingredients are the same as for Example I except that all of the sucrose is replaced by 150 milligrams of calcium cyclamate and 9 milligrams of calcium saccharine. The absence of the sugar makes desirable the use of a binding agent, e. g. 600 milligrams of dextrose.

The blending and dispersion procedure is the same as for Example I except that the dextrose is mixed with the citric acid in the presence of enough water to moisten the same, mixed, dried and powdered and thereafter blended with the calcium carbonate. Alternatively, the dextrose and citric acid are tumbled for about 1½ hours and this composite powder is processed as if it were the citric acid alone.

An 11¾ gram tablet makes a satisfactory seven ounce drink.

*Example V.—Phosphate-containing kola carbonating concentrate*

Constituents:

| | Grams |
|---|---|
| Precipitated calcium carbonate (0.03 micron average mean diameter) | 336 |
| Dried powdered potassium bicarbonate (approx. .004 inch average mean diameter) | 144 |
| Anhydrous powdered citric acid (approx. .004 inch average mean diameter) | 624 |
| Anhydrous powdered monocalcium phosphate | 10 |
| Kola flavoring | 20.5 |
| Certified caramel-colored dye | 1.3 |

The blending and dispersion procedure is the same as for Example I, the monocalcium phosphate being added with and treated as if it were a part of the flavor. Sugar in the same quantity as Example I is added in the same fashion as therein specified.

A 35 gram tablet makes a satisfactory seven ounce drink.

It thus will be seen that I have provided a composition and process for making same which achieves the several objects of my invention and is well adapted to meet the conditions of practical use.

As various possible embodiments might be made of the above invention, and as various changes might be made in the embodiments above set forth, it is to be understood that all matter hereinabove described is to be interpreted as illustrative and not in a limiting sense.

Having thus described my invention, I claim as new and desire to secure by Letters Patent:

1. For use in making a carbonated beverage, a dry effervescent concentrate including an acid factor predominantly comprising citric acid and a carbonate factor comprising at least 60% by weight calcium carbonate, the minimum amount of acid factor present varying directly with the percentage by weight of calcium carbonate in the carbonate factor, said minimum having an upper limit of 13.5 parts by weight of acid factor to 10 parts by weight of total carbonate factor when the carbonate factor is 100% by weight calcium carbonate, and a lower limit of 11.4 parts by weight acid factor to 10 parts by weight total carbonate factor when the carbonate factor is 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

2. For use in making a carbonated beverage, a dry effervescent concentrate including an acid factor predominantly comprising citric acid and a carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

3. For use in making a carbonated beverage, a dry effervescent concentrate including an acid factor predominantly comprising citric acid and a carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, the acid and carbonate being thoroughly dispersed in one another, the concentrate having a density of at least 1.3, whereby a concentrate containing massive amounts of calcium carbonate with respect to an aqueous liquid to which it is to be added will promptly form a clear beverage in which the calcium carbonate is predominantly colloidally suspended and available for prolonged ebullition.

4. For use in making a carbonated beverage, a dry effervescent concentrate including an acid factor predominantly comprising citric acid and a carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition, sufficient carbonate factor being present to supply at least 1.4 grams of carbon dioxide for seven fluid ounces of beverage.

5. For use in making a carbonated beverage, a dry effervescent concentrate including an acid factor predominantly comprising citric acid and a carbonate factor comprising at least 60% by weight calcium carbonate, the acid factor being present in an amount sufficient to produce a pH not greater than 5.0 in the carbonated beverage, the calcium carbonate having a median particle size of about 0.03 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

6. For use in making a carbonated beverage, a dry effervescent concentrate including an acid factor predominantly comprising citric acid and a carbonate factor comprising at least 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

7. For use in making a carbonated beverage, a dry effervescent concentrate including an acid factor predominantly comprising citric acid and a carbonate factor comprising at least 60% by weight calcium carbonate, the calcium carbonate having a median particle size not greater than about 0.1 micron, the citric acid particles being coated with calcium carbonate particles, whereby a concentrate containing massive amounts of calcium carbonate with respect to an aqueous liquid to which it is to be added will promptly form a clear beverage in which the calcium carbonate is predominantly colloidally suspended and available for prolonged ebullition.

8. For use in making a carbonated beverage, a dry effervescent concentrate including an acid factor predominantly comprising citric acid and a carbonate factor comprising at least 60% by weigh calcium carbonate, the calcium carbonate having a median particle size not greater than about 0.1 micron, the citric acid and calcium carbonate being mixed with one another for an extended period of time whereby a concentrate containing massive amounts of calcium carbonate with respect to an aqueous liquid to which it is to be added will promptly form a clear beverage in which the calcium carbonate is predominantly colloidally suspended and available for prolonged ebullition.

9. For use in making a carbonated beverage, a dry effervescent concentrate including an acid factor predominantly comprising citric acid and a carbonate factor comprising at least 60% calcium carbonate, said carbonate being present in massive amounts with respect to an aqueous liquid to which it is to be added and being present in an amount substantially exceeding the solubility limit of calcium carbonate under the conditions of use, said calcium carbonate having a very small particle size, the acid and carbonate factor being thoroughly dispersed in one another, whereby the concentrate when added to an aqueous liquid promptly forms a clear beverage in which the carbonate is predominantly colloidally suspended and available for prolonged ebullition.

10. For use in making a carbonated beverage, a dry effervescent concentrate including an acid factor and a carbonate factor comprising at least 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

11. For use in making a carbonated beverage, a dry effervescent concentrate including an acid factor predominantly comprising citric acid and a carbonate factor comprising at least 60% by weight calcium carbonate and also including a highly soluble, potable salt, the acid factor being present in an amount sufficient to produce a pH not greater than 5.0 in the carbonated beverage, the calcium carbonate having a median particle size not greater than about 0.1 micron, and the acid and carbonate being thoroughly dispersed in another another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

12. For use in making a carbonated beverage, a dry effervescent concentrate including an acid factor predominantly comprising citric acid and a carbonate factor comprising at least 60% by weigh calcium carbonate and also including a highly soluble, potable salt of carbonic acid, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

13. For use in making a carbonated beverage, a dry effervescent concentrate including an acid factor predominantly comprising citric acid and a carbonate factor comprising at least 60% by weight calcium carbonate and also including potassium bicarbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

14. For use in making a carbonated beverage, a dry effervescent concentrate including an acid factor, a carbonate factor, and a flavoring, the acid factor predominantly comprising citric acid and the carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

15. For use in making a carbonated beverage, a dry effervescent concentrate including an acid factor, a carbonate factor, and a dispersing agent, the acid factor predominantly comprising citric acid and the carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

16. For use in making a carbonated beverage, a dry effervescent concentrate including an acid factor predominantly comprising citric acid and a carbonate factor comprising at least 60% by weight calcium carbonate, the carbonate factor being present in an amount sufficient to supply at least 1.4 grams of carbon dioxide per 7 ounces of fluid beverage, the calcium carbonate constituting a fine powder and the citric acid being present in the form of particles which are coated with calcium carbonate, whereby a concentrate containing massive amounts of calcium carbonate with respect to an aqueous liquid to which it is to be added will promptly form a clear beverage in which the calcium carbonate is predominantly colloidally suspended and available for prolonged ebullition.

17. An aqueous carbonated soda beverage including sufficient carbonate to supply at least 1.4 grams of carbon dioxide per seven fluid ounces of beverage, the carbon being present as masisve amounts of calcium carbonate predominantly colloidally suspended and available for prolonged ebullition, said beverage also including an acid factor reacting with the calcium carbonate to produce carbon dioxide and initially imparting to the beverage a pH not greater than 5.0.

18. A process of preparing an effervescent concentrate adapted to produce a carbonated beverage, said process constituting thoroughly blending an acid factor predominantly comprising citric acid with a carbonate factor comprising at least 60% by weight calcium carbonate of a median particle size not greater than 0.1 micron.

19. For use in making a carbonated beverage, a dry effervescent concentrate including an acid factor predominantly comprising citric acid and also including a hexosephosphoric acid and a carbonate factor comprising at least 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

20. For use in making a carbonated beverage, a dry effervescent concentrate including an acid factor predominantly comprising citric acid and also including monocalcium phosphate and a carbonate factor comprising at least 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

21. For use in making a carbonated beverage, a dry effervescent concentrate including an acid factor predominantly comprising citric acid and also including monocalcium phosphate in an amount on the order of 0.1 gram per seven fluid ounces of beverage and a carbonate factor comprising at least 60% by weight calcium carbonate, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

22. For use in making a carbonated beverage, a dry effervescent concentrate including an acid factor, a carbonate factor, and a sweetener, the acid factor predominantly comprising citric acid and the carbonate factor comprising at least 60% by weight calcium carbonate, the acid factor being present in an amount sufficient to produce a pH not greater than 5.0 in the carbonated beverage, the calcium carbonate having a median particle size not greater than about 0.1 micron, and the acid and carbonate being thoroughly dispersed in one another, whereby a concentrate containing massive amounts of calcium carbonate with respect to an aqueous liquid to which it is to be added will promptly form a clear beverage in which the calcium carbonate is predominantly colloidally suspended and available for prolonged ebullition.

23. In a process for preparing a clear aqueous carbonated beverage which is capable of protracted ebullition and which process includes adding to an aqueous liquid a dry effervescent concentrate including an acid factor and a carbonate factor: that improvement comprising the steps of forming one of said factors to include a substantial portion at least of a sparingly soluble, ebullient reacting agent, and dispersing said agent in an aqueous liquid as a predominantly colloidal suspension in an amount substantially exceeding the amount soluble in said liquid under the prevailing conditions, whereby said agent will be available for effervescent reaction over an extended period of time.

24. In a process for preparing a clear aqueous carbonated beverage which is capable of protracted ebullition and which process includes adding to an aqueous liquid a dry effervescent concentrate including an acid factor and a carbonate factor: that improvement comprising the steps of forming the carbonate factor to include a substantial portion at least of a sparingly soluble ebullient reacting agent, and dispersing said agent in an aqueous liquid as a predominantly colloidal suspension in an amount substantially exceeding the amount soluble in said liquid under the prevailing conditions, whereby said agent will be available for effervescent reaction over an extended period of time.

References Cited in the file of this patent

UNITED STATES PATENTS

| | | |
|---|---|---|
| 2,532,281 | Barch | Dec. 5, 1950 |
| 2,603,569 | Alther | July 15, 1952 |
| 2,639,238 | Alther | May 19, 1953 |